United States Patent [19]

Ichihashi et al.

[11] Patent Number: 4,926,906
[45] Date of Patent: May 22, 1990

[54] SPOOL VALVE

[75] Inventors: Kouji Ichihashi; Junichi Tani; Katsuhiko Tsukazaki; Hiroshi Sakuyama; Nobuo Baba; Kiyoji Nakajima; Takaaki Arai; Akira Inaba, all of Higashimatsuyama, Japan

[73] Assignee: Diesel Kiki Co., Ltd., Tokyo, Japan

[21] Appl. No.: 303,656

[22] Filed: Jan. 30, 1989

[30] Foreign Application Priority Data

Mar. 30, 1988 [JP] Japan .................................. 63-74480

[51] Int. Cl.⁵ .............................................. F15B 13/04
[52] U.S. Cl. .............................. 137/625.3; 137/625.69; 251/324
[58] Field of Search ................... 137/625.3, 625.69; 281/324

[56] References Cited

U.S. PATENT DOCUMENTS 3,971,216 7/1976 Miller ......................... 137/596.13 X
3,990,477 11/1976 Johnson .......................... 137/625.69
4,739,797 4/1988 Scheffel .......................... 137/625.3 X

FOREIGN PATENT DOCUMENTS 61-181102 11/1986 Japan .
62-191903 12/1987 Japan .

Primary Examiner—Gerald A. Michalsky
Attorney, Agent, or Firm—Wenderoth, Lind & Ponack

[57] ABSTRACT

A spool valve has a valve housing with a valve bore formed therein, a spool having a land portion slidably accommodated in the valve bore, a control port formed within the valve housing, able to communicate with the valve bore, and opened and closed by the land portion, and an annular groove open at an inner peripheral surface of the valve bore and communicating with the control port. Part of the control port is open over the inner and outer parts, as taken in the widthwise direction, of the annular groove. The degree of opening of the port is variably controlled by the displacement of the land portion.

12 Claims, 3 Drawing Sheets

SPOOL VALVE

BACKGROUND OF THE INVENTION

1. Field of the Invention

This invention relates to a spool valve which has a simple structure and is easy to fabricate or machine and in which a transient flow of working oil can be smoothly controlled during a switching operation of a valve.

2. Description of the Prior Art

In general, a known spool valve defines, on a peripheral surface on its shaft, a land portion for sealing working oil and a passage portion for allowing working oil to pass between a valve bore and itself. In this type of spool valve, the flow of a working oil is regulated by opening or closing an end of port open to the bore with the land portion. In order for the spool valve to permit a smooth transient flow of working oil, special attention has been paid to the design of the spool valve.

For example, Japanese Utility Model Laid-open Publication Nos. Sho 61-181102 and Sho 61-191903 disclose a hydraulic control valve in which a land portion of a spool defines, at the end of its peripheral surface, a plurality of triangular notches. By causing the area of a flow passage of hydrualic oil to vary due to the notches, the flow rate of the hydraulic oil increased to decreased during the opening or closing operation of a port, thereby permitting a smooth flow of working oil.

However, in the conventional valve, the machining of the notches is complicated and difficult. In addition, it is difficult to dimension the notch which substantially determines the area of the passage, thus resulting in high costs.

SUMMARY OF THE INVENTION

One object of the present invention is to provide a simple spool valve which exhibits a technical effect similar to that of the conventional notches.

Another object of the present invention is to provide a spool valve in which a transient flow of working oil can be smoothly controlled during a switching operation of the valve.

A further object of the present invention is to provide a spool valve which has a simple structure and is easy to machine.

A spool valve of the present invention comprises a valve housing having a valve bore formed therein, a spool having a land portion slidably accommodated in the valve bore, a control port formed within the valve housing able to communicate with the valve bore, and opened and closed by the land portion, and an annular groove open at an inner peripheral surface of the valve bore and communicating with the control port. Part of the control port is open over the inner and outer parts, as taken in the widthwise direction, of the annular groove. The degree of opening of the port is variably controlled by displacing the land portion.

The above-mentioned objects, features and advantages of the present invention will become more manifest to those skilled in the art by referring to the following detailed description with reference to the accompanying drawings.

DETAILED DESCRIPTION OF THE PREFERRED EMBODIMENTS

Figure 1:
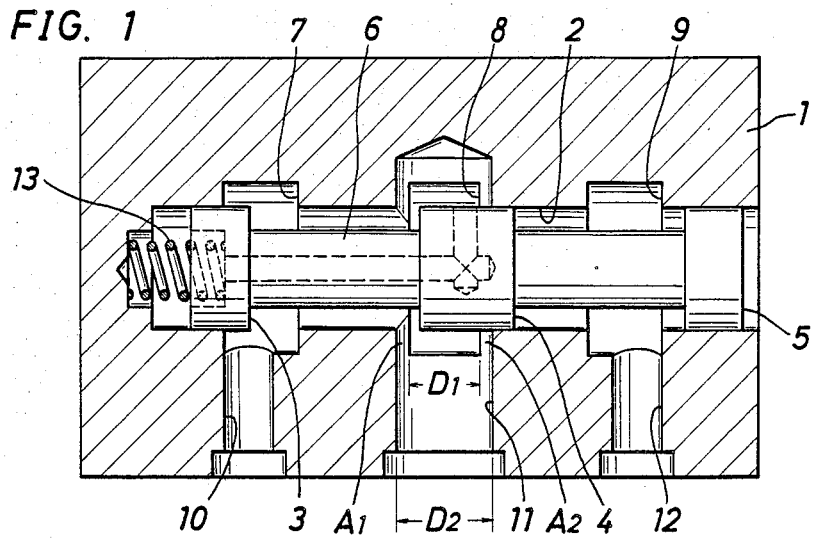
FIG. 1 is a sectional view of one embodiment of a spool valve according to the present invention.

The present invention will now be described with reference to the illustrated embodiment in which the present invention is applied to a 3 port 2 position switch valve. In FIGS. 1 through 4, reference numeral 1 denotes a valve housing having a valve bore 2 formed therein and communicating with a pilot passage (not shown). The bore 2 contains therein a spool 16 having three land portions 3, 4 and 5. The spool 6 can be moved within the bore 2 by pilot pressure.

The inner peripheral surface defining the valve bore 2 has annular grooves 7, 8 and 9 extending therein and each having a diameter larger than the inner diameter of the valve bore 2 and spaced from one another at predetermined intervals. The annular ports 7, 8 and 9 respectively communicate with a tank port 10 which in turn communicates with an oil tank (not shown), an actuator port 11 which communicates with hydraulic equipment such as a hydraulic actuator, etc., and a pump port 12 which communicates with a hydraulic pump.

Of these ports, the inner diameter $D_2$ of the actuator port 11 (hereinafter referred to as the "control port"), serving to control working oil flow in this embodiment, is larger than the groove width $D_1$ of the annular groove 8 which is centered on the port 11. In the illustrated embodiment, the control port 11 can be blocked when the land portion 4 is positioned thereover, and the degree of opening of the control port 11 can be controlled according to the moving position of the land portion 4.

That is, the control port 11 is opened when one end of the land portion 4 is moved from an edge of the valve housing, defining the control port 11, inwardly in the radial direction thereof. The degree of opening of the control port 11 is limited to a comparatively small amount when the end of the land portion 4 is positioned between the edge of the valve housing defining the control port 11 and one side edge of the valve housing defining the annular groove 8. The degree of opening of the control portion 11 is initially generally gradually increased or gradually decreased according to the position of the end of the land portion 4. Then, the degree of opening of the control portion 11 is uniformly radically increased as the end of the land 11 is moved within the annular groove 8, and a predetermined rate of low is maintained irrespective of the position of the end of land 11.

Therefore, the area excluding the annular groove 8 within the control port 11, that is, the area between the inner diameter $D_2$ of the control port 11 and the groove width $D_1$ of the annular roove 8 is a variable control zone for the working oil and corresponds to the conventional notch since the degree of opening of the control port 11 is generally gradually increased or gradually decreased as the land portion 4 is moved in the zone.

In this embodiment, the annular groove 8 is centered above the control port 11 and $D_2 > D_1$. Therefore, to both sides of the annular groove 8 are variable control zones $A_1$ and $A_2$ having an equal width. However, the number, the position, the size, etc. of the areas can properly be designed as desired.

Figure 5:
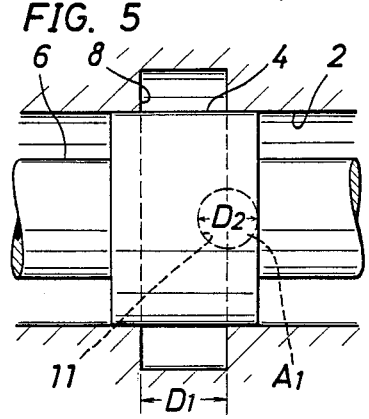
FIGS. 5 through 7 are sectional view of second through fourth embodiments of the present invention, respectively.

For example, if the location of the annular groove 8 is displaced from the axis of the control port 11, the position and the size of the control areas $A_1$ and $A_2$ can be changed. Also, as a second embodiment shown in FIG. 5, if the control port 11 is formed adjacent one side edge defininng the annular groove 8, the portion of the open end of the control port 11 projecting from the one side edge defines the variable control zone. In this case, to only one side of the land portion 4 is formed the variable control zone $A_1$.

And, since the inner diameter $D_2$ of the control port 11 can be made smaller than the groove width $D_1$ of the annular groove 8 in this second embodiment, the second embodiment is suitable for a small spool valve.

Figure 6:
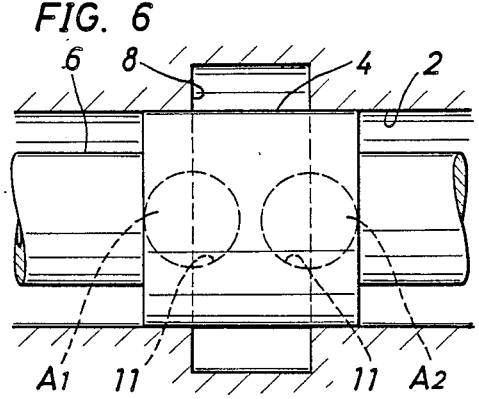

Also, if a plurality of control ports 11, 11 are open at both side edges defining the annular groove 8 as shown in the third embodiment of FIG. 6, the portions of the open ends thereof projecting from the groove 8 define the control areas $A_1$ and $A_2$. In this case, by selecting the number and the position of the right and left control ports 11 and by designing the inner diameters $D_2$ thereof so that they have either the same or different diameters, the degree of opening thereof can be controlled highly accurately.

Figure 7:
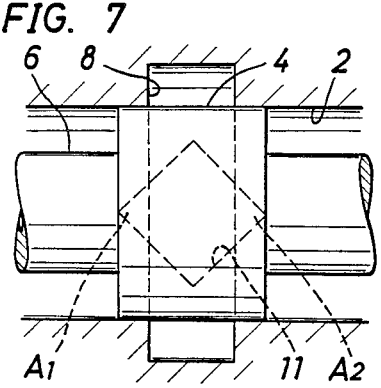

If the control port 11 is formed to have various polygonal configurations, e.g., a diamond configuration as shown in the fourth embodiment of FIG. 7 instead of a circular configuration, an opening state different from that provided by a circular hole can be obtained. That is, in the case of a port having a circular configuration, the degree of opening of the control port 11 exhibits a generally proportional relation with respect to the displacement of the land portion 4 as will be described. On the other hand, in the case of a port having a diamond configuration, a perfect proportional relation is established. Therefore, there can be obtained an advantage in that the flow of working oil can be contolled with ease.

In the figure, reference numeral 13 denotes a set spring interposed between the blocked end of the valve bore 2 and one end of the spool 16.

In manufacturing a spool valve having the abovementioned structure, for example, the housing 1 is bored to form the valve bore 2, and then the inner peripheral surface of the valve bore 2 is polished to a flat and smooth surface. Then, the bore 2 is further bored at predetermined locations to form annular rooves 7, 8 and 9, and then ports 10, 11 and 12 are formed adjacent to the annular grooves 7, 8 and 9 by suitable means.

Of these ports, in the case of the first embodiment, the control port 11 and the annular roove 8 associated therewith are centered, and the inner diameter $D_2$ and the groove width $D_1$ hereof are designed so that $D_2 > D_1$.

Therefore, the above-mentioned machining treatment for forming the valve bore 2 and the ports 10, 11, and 12 is substantially the same as that for the conventional valve except for the aforementioned design of dimensions. Besides, since the fabrication of the particular dimensions is not particularly difficult, it can be sufficiently carried out in correspondence with the conventional machining art. Also, a valve body of the present invention can be obtained merely by performing a slight machining operation on a conventional valve body.

Next, the spool 6 has substantially the same structure as the conventional spool of this type of valve. In the manufacture thereof, spool material is cut to form the land portions 3, 4 and 5. Of the land portions, the width of the land 4 is formed long enough so that at least the open end of the control port 11 can be sealed. And, the peripheral surfaces of the land portions 3, 4 and 5 are each polished to form respective flat and smooth surfaces. This can satisfactorily be done by performing conventional machining operations. Also, already existing spool can be used as is.

Moreover, the variable control zones $A_1$ and $A_2$ which take the place of the notches formed in the conventional spool are formed substantially by the control port 11 and the annular groove 8. Since these can be obtained merely by boring, the manufacture and machining thereof are very easy. Since the formation of the variable control zones does not require as complicated a machine operation as required to fabricate the conventional notches, a strict dimensional control is not required either.

Since the annular groove 8 is formed in a centered position with respect to the control port 11 in this embodiment, both side edges defining the annular groove 8 and adjacent the open end of the control port 11 form variable control zones $A_1$ and $A_2$ of an equal width.

In the spool valve comprising the valve housing 1 and spool 6 assembled together, the tank port 10 and the control port 11 normally communicate with each other and the pump port 12 is normally blocked as shown in FIG. 1.

Figure 3A:
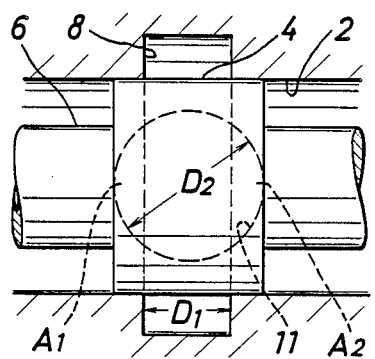
FIGS. 3(a) through 3(d) are sectional views of an important portion of the present invention showing different operational states thereof.

When the spool valve is switched to an offset position under pilot pressure, the control port 11 and the pump port 12 communicate with each other and cause the tank port 10 to be blocked and thereafter, the pilot pressure is relieved. In this case, the spool 6 is moved to the open side of the valve body 1 by the set spring 13 and at one stage during such movement, the land portion 4 is brought to be correctly opposite the control port 11 to block the port 11 as shown in FIG. 3(a). Therefore, in this case, the degree of opening of the control port 11 is zero.

Figure 3B:
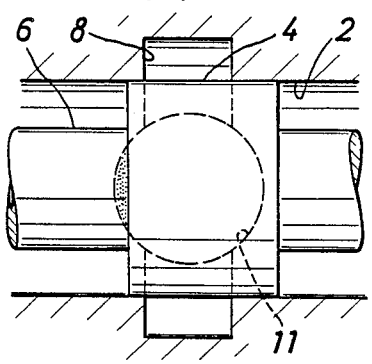

And, when the land is moved from the above-mentioned state rightward in the figures and the axial end portion is separated from the opening edge defining the control port 11, the port 11 is opened to a degree corresponding to the amount of movement, as represented by the scattered dot portion in FIG. 3(b), and the working oil flows toward the tank port 10 from the control port 11 through the open end thereof.

Figure 3C:
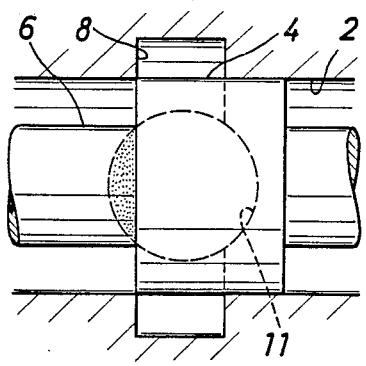

In this way, when the control port 11 is opened and the land portion 4 is moved in the same direction, the degree of opening of the port 11 corresponds to the amount of movement, i.e., the open area is increased and the flow rate of the working oil is increased. In this case, the configuration of the open portion of the control port 11, as shown in FIGS. 3(b) and 3(c), exhibits a generally segmental shape as defined by one portion of the inner peripheral surface of the port 11 and onen end face of the land portion 4 and the open area is generally porportional to the amount of movement of the land portion 4. In other words, the open area is generally proportional to the stroke of the spool 6.

Figure 4:
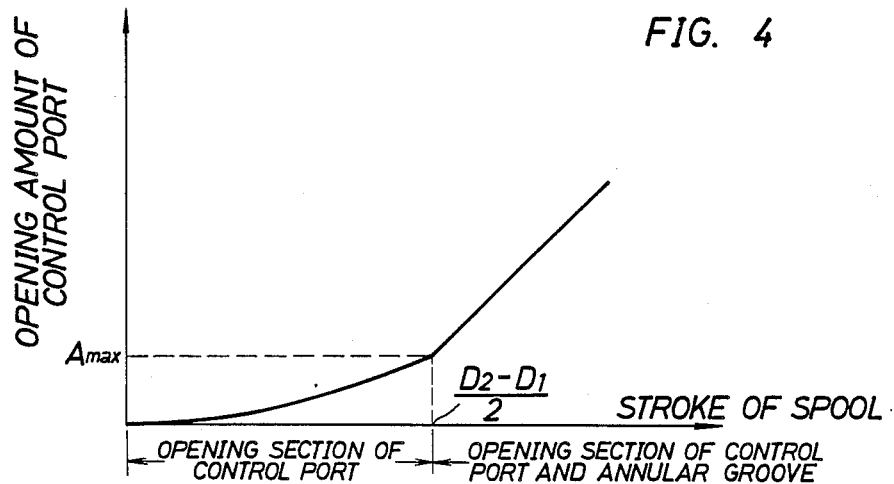
FIG. 4 is a graph illustrating the working characeristics of the present invention in which the relation between the degree of opening of a control port and the stroke of the spool is shown.

Therefore, the degree of opening of the control port 11 can be controlled by regulating the stroke of the spool 6. In this case, the flow characteristics of the valve can be represented by a gradually increasing curve as shown in FIG. 4. In this case, since the flow chracteristics depend on the open area and the configuration of the control port 11, the curvature of inclination of the curve can be varied by increasing of decreasing the length of the inner diameter $D_2$. Furthermore the same effect can also be obtained by varying the configuration of the opening.

In this way, when the end portion of the land portion 4 has gradually been moved and overlies one side edge defining the annular groove 8 as shown in FIG. 3(c), the control port 11 is open to the maximum amount within the variable control zone $A_1$. That is, since the marginal edge of the land portion 4 is aligned with the marginal edge defining the annular groove 8, a seal therebetween can be maintained thus resulting in a zero-lap state. And, when the land portion 4 is moved even a small amount over the groove 8, the sealing effect is lost thereby releasing the control of the flow of the working oil.

Therefore, the opening amount $A_{max}$ of the control port 11 occurs within the variable control zone $A_1$ at the abovementioned position of the land portion 4. In this case, the stroke of the spool 6, i.e., the displacement of the spool 6 required from the beginning to the end of the control of the flow of the working oil, or ½ the difference between the inner diameter $D_2$ of the control port 11 and the width $D_1$ of the annular groove, or the segmental area of the control port in the above-mentioned control zone $A_1$, corresponds to the length of the conventional notch.

Therefore, by increasing or decreasing the segmental area of the control port 11 in the control zone $A_1$, the transient control flow rate and control time of the working oil can be regulated.

Figure 3D:
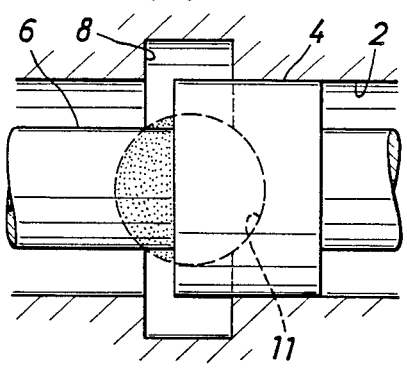
Figure 2:
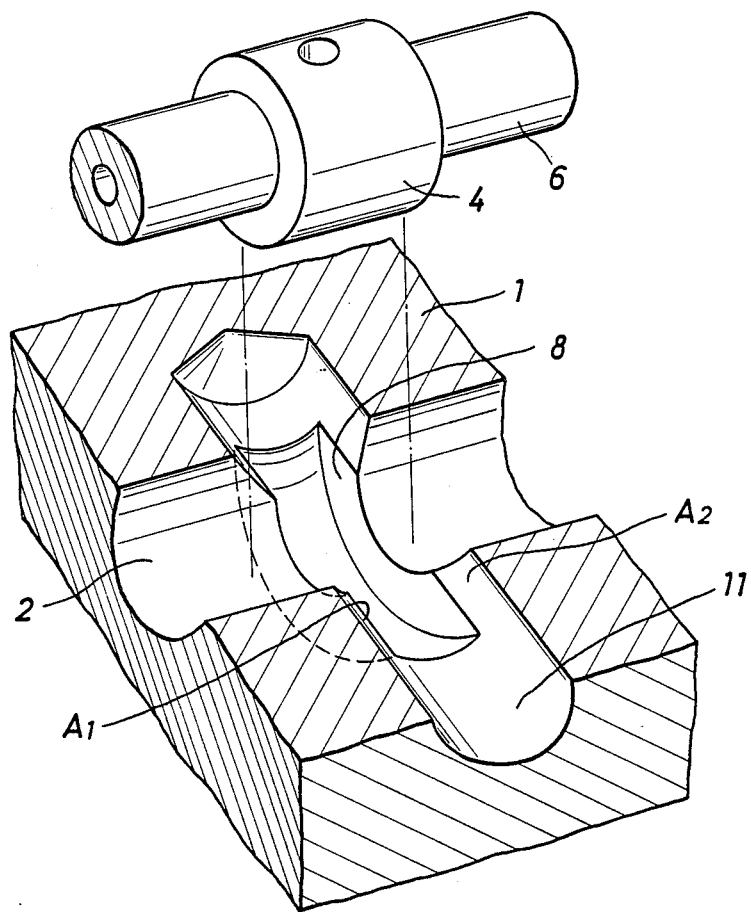
FIG. 2 is a perspective exploded view of an important portion of the present invention.

In this way, when the land portion 4 has been moved rightward from the position shown in FIG. 3(c), the zero-lap state between the land portion 4 and annular groove 8 ceases and the groove 8 is caused to communicate with the control port 11 as shown in FIG. 3(d).

As a result, the degree of opening of the control port 11 is radically increased as shown in FIG. 4 because the open area associated with the entire annular groove 8 is added to the degree of opening of port 11. As a result, a constant flow rate from the control port 11 to the tank port 10 is realized.

The invention has thus been shown and described with reference to the specific embodiments; however, it should be noted that the invention is in no way limited to the details of the illustrated embodiments but changes and modifications may be made therein without departing from the scope of the appended claims.

What is claimed is:

1. A spool valve comprising:
    a valve housing having a valve bore extending in an axial direction therein, a control port extending therein and intersecting said valve bore so as to be open thereto at an opening of the control port, and a groove extending therein circumferentially of and open to said valve bore,
    said opening having a diameter as taken transversely of said axial direction that is less than the diameter of said valve bore,
    said groove being defined between inner peripheral surfaces of said valve housing which are spaced apart in and extend perpendicular to said axial direction, at least one of said inner peripheral surfaces lying in a plane intersecting said opening so that a segmental portion of said opening is disposed to one side of said groove in said axial direction, said segmental portion having a predetermined width as taken in said axial direction and defining thereover a control zone in the valve; and
    a spool mounted to said valve housing within said valve bore so as to be slidable therein in said axial direction, said spool including a land having an outer circumferential surface complementary to and slidable over an inner peripheral surface of said valve housing defining said valve bore, said land having a width as taken in said axial direction that is at least equal to the maximum diameter of said opening of said control port as taken in said axial direction, and said spool being slidable within said valve bore between a position at which said land closes said control port to said valve bore and a position at which said control port is open to said valve bore via at least the segmental portion of the opening of said control port.

2. A spool valve as claimed in claim 1, wherein said valve bore has a circular cross-section and said land is cylindrical, said groove is annular thereby extending completely around said valve bore, each of said inner peripheral surfaces of said valve housing between which said groove is defined lines in a plane intersecting said opening so as to define a segmental portion of said opening disposed to each side of said groove in said axial direction.

3. A spool valve as claimed in claim 2, wherein said groove has a width as taken in said axial direction that is less than the maximum diameter of said opening as taken in said axial direction, said groove is centered with respect to said opening, and the segmental portions of said opening disposed to each side of said groove in said axial direction have the same shape and area.

4. A spool valve as claimed in claim 2, wherein said opening is circular.

5. A spool valve as claimed in claim 1, wherein said groove has a width as taken in said axial direction that is less than the maximum diameter of said opening as taken inn said axial direction, and only one of said inner peripheral surfaces of said valve housing defining said groove lies in a plane intersecting said opening.

6. A spool valve as claimed in claim 1, wherein said opening has a shape other than circular.

7. A spool valve as claimed in claim 1, wherein said groove has a width as taken in said axial direction that is greater than the maximum diameter of said opening as taken in said axial direction, and said groove is off center with respect to said opening.

8. A spool valve as claimed in claim 7, wherein only one of said inner peripheral surfaces of said valve housing defining said groove intersects said opening.

9. A spool valve as claimed in claim 1, wherein only one of said inner peripheral surfaces of said valve housing defining said groove intersects said opening.

10. A spool valve as claimed in claim 1, wherein said valve housing has a plurality of said control ports extending therein, and said inner peripheral surfaces between which said groove is defined lie in planes each of which intersects a respective one of said plurality of control ports.

11. A spool valve as claimed in claim 10, wherein said plurality of control ports have diameters, as taken in said axial direction, that are of equal magnitude to one another.

12. A spool valve as claimed in claim 1, wherein the entire outer circumferential surface of said land is cylindrical.

* * * * *